Nov. 12, 1963    P. PRAKASH    3,110,197
METHOD OF AND MEANS FOR CONVERSION OF TORQUE FROM PRIME MOVERS
Filed March 8, 1962

INVENTOR.
PREM PRAKASH
BY WILSON, SETTLE & CRAIG
ATTORNEYS

United States Patent Office 3,110,197
Patented Nov. 12, 1963

3,110,197
METHOD OF AND MEANS FOR CONVERSION OF TORQUE FROM PRIME MOVERS
Prem Prakash, Alambagh, P.O. Singhar Nagar, Lucknow, Uttar Pradesh, India
Filed Mar. 8, 1962, Ser. No. 178,421
2 Claims. (Cl. 74—677)

This invention relates to a torque converting device and has for its object to obtain a continuously variable torque when fed with torque from prime movers particularly those having a substantially constant torque output at various speeds such as internal combustion engines.

A device called a DIWABUS is known in the art and in this is employed an input shaft connected to a mechanical differential divider, one member of which divider is connected to the output shaft and a second member is connected to the impeller of a hydrodynamic torque converter, the output member of the said convertor being connected to the said output shaft with the result that the torque from the input shaft gets divided at the differential divider into two paths, one being the direct path where one member of the divider is connected to the output shaft, and the other being the path through the hydrodynamic convertor. The resultant torque at the output shaft is the sum of the torque from the direct path and the multiplied torque output from the converter. In this device, the input torque gets split into two paths in a proportion which always remains fixed even when the speed of the output shaft changes. To obtain a continuous variation of the torque at the output end, the fixed proportion of torque received by the hydrodynamic converter gets multiplied in the said converter to a continuously variable extent depending upon the speed of the output shaft.

There is also known another system under the name SRM convertor in which is employed a hydrodynamic torque convertor having three members, one member being connected directly to the input shaft, the second member being connected to the output shaft and the third member which is the reaction member being connected to an auxiliary shaft which in turn is geared to the output shaft. The direction of rotation of the reaction member of the said convertor is reverse of the direction of rotation of the said second member of the convertor. The torque obtained from the reaction member is, therefore, corrected in direction through the gears before it is applied to the output shaft. Continuous variation of the torque at the output shaft is obtained in this device by multiplying in the hydrodynamic convertor the entire input torque all the time, the said multiplication being to a continuously variable extent dependent upon the speed of the output shaft.

In the SRM system the efficiency of power transmission soon falls to zero after passing through a maximum. To keep the operational efficiency within acceptable ranges, the motion of the auxiliary shaft and the connected reaction member of the convertor has to be arrested completely, when the output shaft has picked up a specific speed.

According to my invention, a hydromechanical device, wherein the torque from the input shaft is first split into at least two paths, one or both of the said split torques being multiplied and finally integrated for application to the output shaft, is characterised by the feature that the proportions of the split torques flowing through the two paths vary with the speed of the output shaft and the multiplications of the torques flowing through the two paths are effected by unequal factors, which factors always remain constant and wherein when the output shaft is stationary, as large a part of the input torque as possible passes through the path which has a larger torque multiplication factor, while when the output shaft is rotating at a specific speed which depends upon the value of the smaller torque multiplication factor, then most of the input torque passes through the path having the smaller torque multiplication factor, the so multiplied torques being then integrated for supply to the output shaft.

According to this invention the device comprises an input shaft on which are mounted two gears acting as mechanical divider to split the input torque into at least two paths, a hydrodynamic torque convertor functioning as in integrator and having at least three members, the said two paths feeding the torque to two members of the said integrator after respectively unequal but constant multiplications of the said split torques, an output shaft connected to the third member of the integrator, and wherein when the output shaft is stationary, as large a portion as possible of the input torque is being absorbed by the first member of the integrator connected to the path having the higher torque multiplication, the rotation of the second input member of the integrator affecting the angular momentum of the fluid in the hydrodynamic convertor as little as possible, the output member of the integrator thus reacting to the fluid vortex generated mainly by the rotation of the first member of the integrator, and when the output shaft rotates at a specific speed which depends upon the smaller torque multiplication ratio arranged for the second path, all the torque is absorbed through the second member of the integrator, the rotation of the first member not affecting the angular momentum of the fluid, the output member of the integrator thus reacting to the fluid vortex generated by the second input member, the whole device acting as a variable torque converting device from zero speed to the said specific speed of the output shaft.

According to a further modification, the device comprises an input shaft, a hydrodynamic convertor acting as a divider to split the input torque into at least two paths, said divider having at least three members, one member being connected to the input shaft, the other two members being connected respectively to two shafts comprising the two paths, the said two shafts being connected to the output shaft through gear wheels, which gear wheels provide unequal but constant multiplication to the torque on its passage to the output shaft and serve to integrate on the output shaft the thus multiplied torque, the blading design of the three members of the said hydrodynamic convertor or divider being such that when the output shaft is stationary, as large a portion of the input torque as possible is split to flow out through the path having a larger torque multiplication ratio, the presence of the third member affecting the angular momentum of the fluid as little as possible, and when the output shaft is rotating at a specific speed depending upon the value of the smaller torque multiplication, most of the torque flows out through the third member connected to the path having the smaller torque multiplication, the rotation of the second member affecting the angular momentum of the fluid as little as possible, the whole device thus acting as a variable torque converting machine from zero speed to the said specific speed of the output shaft.

According to another modification, the device comprises an input shaft, the torque of which is divided into at least two paths, through two gears, mounted on the input shaft, one gear meshing with a gear mounted on a first auxiliary shaft, the other gear meshing with a gear on a second auxiliary shaft, a hydrodynamic convertor having four members, one member being connected to the first auxiliary shaft, the second member being connected to the second auxiliary shaft and the third and fourth members being connected respectively to the third and fourth auxiliary shafts, the said third and fourth auxiliary shafts being geared to the output shaft, the pair of gears between the first and second auxiliary shafts and the input shaft serving to multiply the torque from the input shaft through fixed but unequal ratios such that the torque multiplication in the first auxiliary shaft is higher than the torque multiplication through the second auxiliary shaft, and the pair of gears between the third and fourth auxiliary shafts and the output shaft serving to integrate the torque flowing from the convertor to the output shaft, after multiplication through fixed but unequal ratios such that the torque multiplication in the third shaft is higher that the torque multiplication through the fourth shaft, the arrangement being such that when the output shaft is stationary, as large a part of the input torque as possible is fed into the said convertor through the first auxiliary shaft which has a higher torque multiplication factor than the second auxiliary shaft and as large a part of the torque as possible flows out of the convertor through the third auxiliary shaft which has a higher factor of torque multiplication than the fourth auxiliary shaft, and when the output shaft is rotating at a specific speed, most of the input torque is fed into the said convertor through the second auxiliary shaft which has a lower torque multiplication factor and most of the torque flows out through the fourth auxiliary shaft which has a lower torque multiplication factor.

The invention will now be more fully described with reference to the accompanying drawings in which I have shown by way of illustration some embodiments of the invention.

Referring to the drawings.

Figure 1:
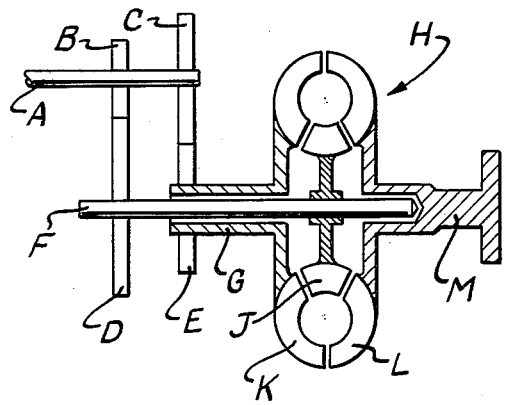
FIG. 1 shows schematically the device in which the splitting of the torque is effected mechanically while integration is effected hydrodynamically.

Referring to FIG. 1, A is the input shaft on which are mounted two gears B and C, meshing with gears D and E respectively mounted on auxiliary shafts F and G. A hydrodynamic torque convertor H acting as integrator has three bladed members or wheels J, K and L. The auxiliary shafts F and G are connected respectively to members J and K while the member L is connected to the output shaft M. The gears B and D provide a fixed torque multiplication between the input shaft A and auxiliary shaft F and gears C and E provide a second fixed torque multiplication between the input shaft A and the auxiliary shaft G. The torque multiplication ratio from gear B to D is higher than that from gear C to E. The two pairs of gear wheels B, D and C, E serve to split the input torque into two paths.

The design of the bladed members J, K and L of the convertor H, is such that when the output shaft M is stationary as large a part of the torque as possible passes through the auxiliary shaft F, the rotation of the bladed member K mounted on shaft G affecting the angular momentum of the fluid in the said convertor as little as possible, the output member L thus reacting to the fluid vortex mainly generated by the rotation of the bladed wheel J.

When the output shaft M rotates at a secific speed, which depends upon the smaller torque multiplication ratio between the gear wheels C and E, all the torque is absorbed by the fluid through the blade member K of the said convertor, the rotation of member J not affecting the fluid angular momentum, so that the output member L reacts to the fluid vortex generated by the blade member K. At other intermediate speeds of the output shaft M, both the members J and K influence the angular momentum of the fluid to varying extent depending upon the speed of the output shaft which results in varying proportions of the input torque to flow through the paths represented by the auxiliary shafts F and G. Continuously variable torque is thus obtained on the output shaft between the zero speed and the said specific speed of the output shaft.

As an illustration, if we assume that the total input torque is equal to "$t$" and the proportion of this torque flowing through the auxiliary shaft F is "$x$," then the proportion of the torque flowing through the auxiliary shaft G is equal to $(1-x)$. If the multiplication of torque from gear B to D is two (2) and the multiplication of torque from gear C to E is half ($\frac{1}{2}$), then the torque on the member J is equal to $2.x.t$ and the torque on the member K is $\frac{1}{2}(1-x).t$. The total integrated torque on the member L is therefore equal to $2.x.t + \frac{1}{2}.t - \frac{1}{2}.x.t$ which equals $1\frac{1}{2}.x.t + \frac{1}{2}t$.

When the output shaft is stationary, most of the torque flows through the auxiliary shaft F, therefore "$x$" is nearly equal to 1 and the total output torque is nearly equal to "$2t$." ($1\frac{1}{2}xt + \frac{1}{2}t = 2t$ when "$x$"=1. At the said specific speed of the output shaft most of the torque flows through the path G and no torque flows through the path F. Therefore $x$ is equal to zero and the total output torque is equal to $\frac{1}{2}t$ ($1\frac{1}{2}xt + \frac{1}{2}t = \frac{1}{2}t$ when "$x$" is equal to zero). At any intermediate speed, the output torque is in between these two limits depending upon the proportion "$x$." Thus a continuously variable torque is obtained on the output shaft M between the limits "$2t$" and "$\frac{1}{2}t$."

Figure 2:
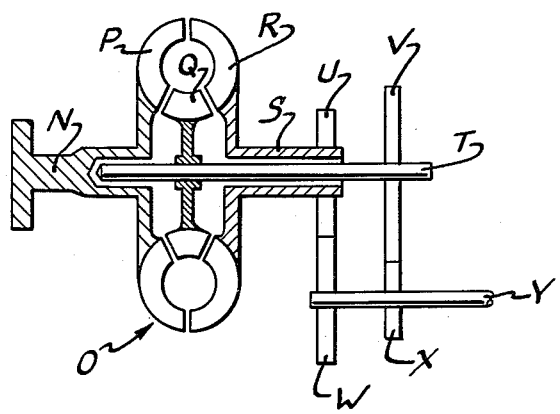
FIG. 2 shows schematically the device in which the splitting of the torque is effected hydrodynamically while integration is effected mechanically.

Referring to an alternative construction shown in FIG. 2, N is the input shaft, O is the hydrodynamic torque convertor having three bladed members P, Q and R. The input shaft N is connected to the bladed member P. The bladed members R and Q are connected to the auxiliary shafts S and T respectively on which are mounted gear wheels U and V meshing respectively with gear wheels W and X both mounted on the output shaft Y.

The bladed members R and Q serve to split the input torque into two paths represented by auxiliary shafts S and T. The gears U, W and V, X provide the multiplication for the torques flowing through the two paths, such that the factor of torque multiplication from gear U to W is higher than that from gear V to X. These gears also serve to integrate on the output shaft Y, the split multiplied torques.

The hydrodynamic convertor in this embodiment acting as a divider is so designed that when the output shaft Y is stationary, as large a part of the input torque as possible flows along the shaft S connected to the bladed member R, the presence of member Q effecting the fluid angular momentum as little as possible and when the output shaft Y is rotating at a specific speed, which depends upon the smaller torque multiplication factor between the gears V and X, most of the input torque flows along the shaft T connected to the member Q, the rotation of the member R not affecting the angular momentum of the fluid in the convertor. At any intermediate speeds, the output torque flows partly through the auxiliary shaft T and partly through S. The whole device thus acts as a variable torque converting device, in the manner already explained above.

Figure 3:
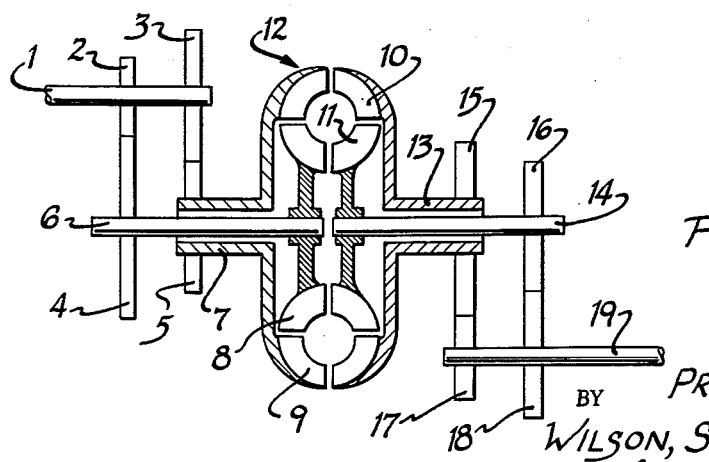
FIG. 3 shows a modification of FIG. 1 in which the hydrodynamic convertor splits the output into two parts and the integration is subsequently achieved mechanically as in the arrangement of FIG. 2.

Referring to a further embodiment shown in FIG. 3, 1 shows the input shaft on which are mounted gears 2 and 3 meshing respectively with gears 4 and 5 mounted on auxiliary shafts 6 and 7. The shaft 6 is connected to member 8 of a hydrodynamic convertor 12. Shaft 7 is connected to member 9. Members 10 and 11 of the convertor are connected to auxiliary shafts 13 and 14 on which are mounted gears 15 and 16 meshing respectively with gears 17 and 18 both mounted on the output shaft 19. In this embodiment, the hydrodynamic convertor has four members 8, 9, 10 and 11. The input torque is split into two paths through the set of gears 2, 4 and 3, 5. The torque multiplication ratio from gear 2 to 4 is higher than that from gear 3 to 5. The torque from the hydrodynamic convertor flows out in two paths represented by auxiliary shafts 13 and 14 and is integrated on the output shaft 19 through the set of gears 15, 17 and 16, 18. The torque multiplication ratio from gear 16 to 18 is higher than that from 15 to 17.

The blade members of the convertor 12 are so designed that when the output shaft 19 is stationary as large a part of the input torque as possible flows into the convertor from the auxiliary shaft 6, having the larger torque multiplication factor, the rotation of the blade member 9 connected to the auxiliary shaft 7 affecting the angular momentum of the fluid in the convertor as little as possible, and most of the torque flowing out of the convertor goes along the shaft 14 having a larger torque multiplication factor than shaft 13. The presence of the blade wheel 10 on the shaft 13 affects the fluid momentum as little as possible.

When the output shaft 19 is rotating at a specific speed, most of the input torque is absorbed in the convertor through the auxiliary shaft 7 and most of the output torque flows through the shaft 13 and the rotation of members 9 and 11 affects the fluid angular momentum as little as possible. The whole device thus acts as a continuously variable torque convertor.

The blade member of the hydrodynamic convertor which is connected to the shaft having a higher torque multiplication ratio is mounted on the said shaft through a free-wheeling device such that if the direction of the torque on the said blade member reverses due to the output shaft rotating at a speed greater than the specific speed mentioned before, the blade member rotates freely on the shaft without absorbing any torque in the reverse direction.

In the embodiment of FIG. 1, the bladed member J is mounted on the shaft F through a free-wheeling device such that the member J can over-run the said shaft in its direction of rotation.

In the embodiment of FIG. 2, the member R is mounted on the shaft S through a free-wheeling device such that the member R can over-run the shaft S in a direction opposite to the direction of rotation of the said shaft.

In the embodiment in FIG. 3, the member 8 is mounted on the shaft 6 through a free-wheeling device such that it can over-run the said shaft 6 in its direction of rotation and member 11 is similarly mounted on the shaft 14 such that it can over-run the said shaft in a direction opposite to the direction of rotation of said shaft.

I claim:

1. A hydromechanical device for obtaining a continuously varying torque at the output shaft comprising an input shaft, the torque of which is divided into at least two paths, through two gears mounted on the input shaft, a first auxiliary shaft carrying a third gear, one of said two gears meshing with said third gear, a second auxiliary shaft carrying a fourth gear, the other of said two gears meshing with said fourth gear, third and fourth auxiliary shafts, a hydrodynamic convertor having four members, one member being connected to the first auxiliary shaft, the second member being connected to the second auxiliary shaft and the third and fourth members being connected respectively to the third and fourth auxiliary shafts, the said third and fourth auxiliary shafts being geared to the output shaft, the pair of gears between the first and second auxiliary shafts and the input shaft serving to multiply the torque from the input shaft through fixed but unequal ratios such that the torque multiplication in the first auxiliary shaft is higher than the torque multiplication through the second auxiliary shaft, and the pair of gears between the third and fourth auxiliary shafts and the output shaft serving to integrate the torque flowing from the convertor to the output shaft, after multiplication through fixed but unequal ratios such that the torque multiplication in the third shaft is higher than the torque multiplication through the fourth shaft, the arrangement being such that when the output shaft is stationary, as large a part of the input torque as possible is fed into the said convertor through the first auxiliary shaft which has a higher torque multiplication factor than the second auxiliary shaft and as large a part of the torque as possible flows out of the convertor through the third auxiliary shaft which has a higher factor of torque multiplication than the fourth auxiliary shaft, and when the output shaft is rotating at a specific speed, most of the input torque is fed into the said convertor through the second auxiliary shaft which has a lower torque multiplication factor and most of the torque flows out through the fourth auxiliary shaft which has a lower torque multiplication factor.

2. In a torque converter,
a fluid coupling comprising first and second bladed impellers opposing first and second bladed runners,
each of said impellers having a shaft,
a power input shaft producing torque,
means dividing the torque from said input shaft and feeding it into said impeller shafts at unequal multiplication,
each of said runners having a shaft,
a power output shaft,
and means connecting said runner shafts and said power output shaft at unequal multiplications.

References Cited in the file of this patent

UNITED STATES PATENTS

| | | |
|---|---|---|
| 2,055,895 | Fawcett | Sept. 29, 1936 |
| 2,318,660 | Barrett | May 11, 1943 |
| 2,360,259 | Murray | Oct. 10, 1944 |
| 2,481,529 | Norelius | Sept. 13, 1949 |